United States Patent [19]

Burow et al.

[11] Patent Number: 5,035,748
[45] Date of Patent: Jul. 30, 1991

[54] STORAGE-STABLE INORGANIC PIGMENTS CONTAINING SPECIFIC POLYORGANOSILOXANES WITH LONG CHAIN ARYL AND/OR ALKYL GROUPS

[75] Inventors: Wilfried Burow, Krefeld; Jürgen Kischkewitz, Ratingen; Ottfried Schlak, Cologne, all of Fed. Rep. of Germany

[73] Assignee: Bayer Aktiengesellschaft, Leverkusen, Fed. Rep. of Germany

[21] Appl. No.: 440,619

[22] Filed: Nov. 22, 1989

[30] Foreign Application Priority Data

Dec. 13, 1988 [DE] Fed. Rep. of Germany ....... 3841848

[51] Int. Cl.$^5$ .................... C08K 5/54; C04B 20/10
[52] U.S. Cl. .................................. 106/499; 106/416; 106/417; 106/426; 106/431; 106/435; 106/446; 106/454; 106/465; 106/490; 528/31; 556/451
[58] Field of Search ............... 106/417, 431, 435, 446, 106/454, 426, 465, 416, 490, 499; 528/31; 556/451

[56] References Cited

U.S. PATENT DOCUMENTS

| | | | |
|---|---|---|---|
| 2,891,875 | 6/1959 | Phreaner | 106/490 |
| 2,891,923 | 6/1959 | Phreaner | 523/212 |
| 3,849,152 | 11/1974 | Mimeault | 106/454 |
| 4,810,305 | 3/1989 | Braun et al. | 106/499 |
| 4,832,944 | 5/1989 | Socci et al. | 424/61 |

FOREIGN PATENT DOCUMENTS

| | | |
|---|---|---|
| 0023265 | 2/1981 | European Pat. Off. . |
| 0257423 | 3/1988 | European Pat. Off. . |
| 3211976 | 10/1982 | Fed. Rep. of Germany . |
| 959211 | 5/1964 | United Kingdom . |

Primary Examiner—William R. Dixon, Jr.
Assistant Examiner—Scott L. Hertzog
Attorney, Agent, or Firm—Sprung Horn Kramer & Woods

[57] ABSTRACT

An inorganic pigment comprising a content of at least 0.1% by weight and at most 5% by weight of one or more polyorganosiloxanes, wherein the polyorganosiloxanes have viscosities of 10 to 100,000 mPa.s and a relative molecular weight of 500 to 500,000, have no reactive or crosslinking groups, contain at least one $C_9$–$C_{25}$ Si-alkyl and/or one $C_9$–$C_{25}$ Si-aryl group per molecule, the total content of these groups in the polyorganosiloxane being 7-70% by weight and the other organic radicals contained in the polyorganosiloxane having 1 to 8 carbon atoms. Such pigments can be used in lacquers, emulsion paints, plastics, toners, magnetic recording materials, building materials and enamels.

7 Claims, No Drawings

STORAGE-STABLE INORGANIC PIGMENTS CONTAINING SPECIFIC POLYORGANOSILOXANES WITH LONG CHAIN ARYL AND/OR ALKYL GROUPS

BACKGROUND OF THE INVENTION

1. Field of the Invention

This invention relates to inorganic pigments having improved properties, to their production and to their use for incorporation in lacquers, emulsion paints, plastics, toners, magnetic recording materials, building materials and enamels.

2. Background Information

Inorganic pigments such as, for example, chromium oxides, chromate and molybdate pigments, iron oxides, rutile or spinel mixed phases and ultramarine pigments as well as white pigments, are generally used for coloring paints, plastics and building materials or as pigments for coloring enamels and ceramics. They are generally treated before or during grinding with suitable additions of surface-active substances, which are intended to improve the grinding and pigment properties of the hydrophilic pigments.

Fatty acids and fatty acid esters, alkylamines, vinyl polymers, silicones, etc. are used as surface-active coating materials for those applications of the inorganic pigments where hydrophobic or lipophilic pigment surfaces are required, for example, in pigments for coloring plastics or for use in magnetic recording materials.

Within the group of silicones, polydimethyl or polydiphenyl siloxanes have long been used as coating materials. The disadvantage of these coating materials is that they can gradually become detached from the pigment surface. Accordingly, it has been proposed to use aqueous suspensions of mixtures of silicone oil and water-soluble silicates for hydrophobicizing building materials (W. Noll, *Chemie und Technik der Silicone*, page 524, Weinheim 1968) or for hydrophobicizing fillers (U.S. Pat. Nos. 2,891,875 and 2,891,923), the silicates being intended to act as adhesion promoters between the silicone oil and the surface of the inorganic materials to be coated.

This silicate-containing coating is unsuitable for inorganic pigments because it adversely affects the processing properties of the pigments in lacquers.

Numerous systems which do not require an expensive silicate/silicone oil double coating have been proposed with a view to obtaining coatings which adhere permanently to the pigment surface.

Thus, EP 0 273 867 describes a composition for improving the hydrophobic properties of inorganic materials which consists of an alkyl trialkoxysilane and an alcohol or hydrocarbon as a solvent and which optionally contains a hydrolysis catalyst. The composition is chemically attached to the surface of the inorganic material to be hydrophobicized and the alkoxysilanes condense to form a polymeric coating.

U.S. Pat. No. 3,849,152 describes the encapsulation of pigments with silicone oils which contain active groups for forming bonds with the pigment surface and which polymerize in situ during the coating process to form a solid coating. These polysiloxanes preferably contain terminal H atoms, OH groups and alkoxy groups and release inter alia alcohols and hydrogen during the coating process.

The polysiloxanes known from EP 257 423, which are likewise used for the coating of pigments and fillers, also form hydrogen. The formation of hydrogen leads to significant technical problems during the production of such coated pigments.

DE 2 543 962 describes a process for improving the dispersion properties of iron oxide magnetic pigments in which, for example, a suspension of iron oxide pigment and ammoniacal ethanol and alkoxysilane is boiled under reflux and dried for several hours at high temperatures.

GB-P 959,211 describes compositions of polyamide fibers containing fillers or inorganic pigments which may be coated with organosilicon compounds. The particular organosilicon compounds with which they have been coated are unimportant to the use of the fillers or inorganic pigments in polyamide fibers. By contrast, the type of surface coating is of considerable importance for inorganic pigments incorporated in lacquers, emulsion paints, plastics, toners, magnetic recording materials, building materials and enamels. Thus, the octamethyl cyclotetrasiloxane used, for example, in GB-P 959,211 is unsuitable because of its poor adhesion properties for the coating of inorganic pigments used in lacquers, emulsion paints, plastics, etc.

Organopolysiloxanes containing alkyl or aryl groups, in which the number of carbon atoms is at most 8 and preferably 1, are described in DE 3 537 415 as hydrophobicizing agents for titanium dioxide used for coloring photographic paper supports. Organopolysiloxanes such as these containing short terminal groups are unsuitable for the coating of inorganic pigments because they do not sufficiently protect the pigment against taking up moisture and pigments thus coated emit dust in large quantities.

All the coatings and coating processes mentioned above are unsatisfactory because they lead to technically unsatisfactory solutions or pollute the environment through the coating process. The coating process should take place in such a way that there is no need for the addition of solvents which have to be subsequently removed.

The chemical attachment of the coating material to the pigment surface with simultaneous elimination of such substances as, for example, alcohols, amines, halogenated hydrocarbons or hydrogen should also be avoided.

In addition, the coated pigments should meet stringent requirements in regard to the stability of their pigment properties and the adhesion of their surface coating.

The pigment processor expects the ground pigments intended for coloring to have favorable coloring properties, adequate fineness from the grinding process and dispersibility and high compatibility with paints, building materials and plastics, irrespective of the nature and duration of storage and irrespective of any temperature and weathering influences during transport and storage.

Accordingly, there is a need for hydrophilic or hydrophobic organic pigments having a stable surface coating which do not lose any of their favorable pigment properties in storage and of which the coating does not decompose or become detached from the pigment surface.

Accordingly, the problem addressed by the present invention was to provide coated pigments which do not have any of the disadvantages mentioned above.

SUMMARY OF THE INVENTION

It has now surprisingly been found that the pigments according to the invention described hereinafter meet the demands made of them and that storable pigments having favorable processing properties for coloring paints, plastics, building materials, enamels and ceramics are surprisingly obtained and, in addition, show improved flow and grinding behavior in the grinding process.

The inorganic colored and magnetic pigments according to the invention have a content of at least 0,1% by weight and at most 5% by weight of one or more polyorganosiloxanes and are distinguished by the fact that the polyorganosiloxanes have viscosities of 10 to 100,000 mPa.s and a relative molecular weight of 500 to 500,000, have no reactive or crosslinking groups, contain at least one $C_{9-25}$ Si-alkyl and/or one $C_{9-25}$ Si-aryl group per molecule, the total content of these groups in the polyorganosiloxane being 7-70% by weight and the remaining organic groups contained in the polyorganosiloxane having from 1 to 8 carbon atoms.

DETAILED DESCRIPTION OF THE INVENTION

Particularly preferred polyorganosiloxanes contain at least one $C_{11-20}$ Si-alkyl and/or one $C_{11-20}$ Si-aryl group per molecule.

In another embodiment, 20 to 50% by weight of the Si-alkyl and/or Si-aryl groups are present in the polyorganosiloxane.

The other organic groups in the polyorganosiloxane are preferably methyl groups.

Polyorganosiloxanes containing at least one Si-alkyl group with a linear $C_{11-20}$ alkyl group per molecule are preferred.

The inorganic pigments may be white pigments, such as, for example, $TiO_2$ pigments, or colored pigments, such as, for example, $Fe_2O_3$ pigments.

The polyorganosiloxanes are added to the pigments before or during drying or before or during grinding.

Any known processes which lead to an adhering coating of the polyorganosiloxanes on the base pigment may be used for coating the inorganic pigments.

These processes include, for example, the solventless grinding or spraying of the above-mentioned compounds onto the pigments, in which case the coating may be one or more compounds from the above-mentioned group of coating materials according to the invention or a combination of these coating materials with commercially available chemically inactive coating materials.

The surface coating process may start out either from pigment pastes, to which the surface treatment preparation is added before drying or, preferably, from the dry material to which the organosilicon compound is added before grinding. It is crucial to the aftertreatment that the coating material be absorbed homogeneously onto the pigment surface, the expert being left to decide which process to use for the surface coating of the pigment.

The type of pigment to be coated is immaterial to the coating process, i.e., it does not matter whether the pigment is, for example, an iron oxide or chromium oxide, whether it is, for example a spinel or rutile phase or whether the base pigment is uncoated or provided with an organic or inorganic coating. An inorganic coating of the base pigment is necessary, for example, in those cases where the base pigment is an iron oxide yellow pigment which has been heat-stabilized by an inorganic coating.

Accordingly, in one particular embodiment of the invention, organically or inorganically coated pigments are surface-coated with the polyorganosiloxanes according to the invention mentioned above.

Since the coating materials according to the invention are compounds which adhere firmly to the pigment surface, any method may be used to dry the coated pigment paste, including, for example, spray drying or belt drying, and to grind the dried pigment, including, for example, grinding in a bead mill, jet mill, pinned-disk mill or pendulum roller mill, without the coating according to the invention being damaged in any way.

The hydrophilic character of the pigment surface of the untreated inorganic pigments may be adjusted through the particular quantity of hydrophobicizing polyorganosiloxane added so that it is between hydrophilic/hydrophobic and purely hydrophobic.

It has also surprisingly been found that, after they have been subjected to a granulation process (for example spray drying), the pigments according to the invention combine the advantages of very good flow behavior for minimal dust emission with better dispersibility in plastics than conventional granulated pigments.

In the production of granulated pigments, the compound according to the invention is added to the pigment before and/or during spray drying. It is preferably added to a pigment suspension before spray drying. The organosilicon compound may be converted beforehand into an emulsion or may be directly stirred into the pigment suspension.

The pigment suspension may consist solely of pigment and a volatile liquid, for example water, in a quantity ratio which gives a pumpable and sprayable suspension. Where relatively high pigment contents are required, the necessary reduction in viscosity can be obtained by addition of liquefying substances such as, for example, polyphosphates, formic acid and polyacrylates of different molecular weight distribution.

Spray drying is carried out in known manner. It does not matter whether one-component or two-component nozzles or rotating spray disks are used for spraying.

The pigments coated with polyorganosiloxanes in accordance with the invention are used for incorporation in lipophilic media, toners, magnetic recording materials and plastics.

In addition, the pigments according to the invention are incorporated in lacquers, building materials, ceramic materials and emulsion paints.

The polyorganosiloxanes used to coat the pigments have long been known and may be produced, for example, in accordance with W. Noll, *Chemie und Technologie der Silicone*, 2nd Edition, 1968, page 48 and pages 162 to 211.

The following Examples are intended to illustrate the invention without limiting it in any way.

The following pigments were used as base materials for the coating:

A: Bayferrox 110 M, a product of Bayer AG, iron oxide red pigment
B: Bayferrox 105 M, a product of Bayer AG, light iron oxide red pigment
C: Bayferrox AC 5069, a product of Bayer AG, heat-stable iron oxide yellow pigment
D: Bayferrox PK 5079, a product of Bayer AG, flocculation-stable iron oxide red pigment E: Lichtgelb 5R, a product of Bayer AG, light-fast pigment
F: Bayertitan R-FK-2, a product of Bayer AG, finely ground titanium dioxide white pigment
G: Bayertitan R-FK-3, a product of Bayer AG, light- and weather-resistant, finely ground titanium dioxide white pigment
H: Bayertitan R-FK-21, a product of Bayer AG, granulated titanium dioxide white pigment The following additives were used: Silicone oils corresponding to the following formula $$Me_3SiO[MeRSiO]_x[Me_2SiO]_ySiMe_3:$$

1: $x=5$; $y=20$; $R=n-C_{12}H_{25}$, $n-C_{14}H_{29}$ in a ratio of 2:1
2: $x=5$; $y=20$; $R=n-C_{18}H_{37}$
3: $x=30$; $y=90$; $R=$in equal molar quantities: $n-C_5H_{11}$, $n-C_6H_{13}$; $n-C_8H_{17}$, $n-C_{10}H_{21}$, $n-C_{12}H_{25}$, $n-C_{14}H_{29}$, $n-C_{18}H_{37}$
4: $x=30$; $y=90$; $R=-CH_2-CH-(Me)Ph$
Me=methyl, Ph=phenyl The following surface coating materials were used for the comparison tests:
X1: silicone oil corresponding to the formula:

$$Me_3SiO[Me_2SiO]_xSiMe_3$$

$x=80-90$
X2: silicone oil corresponding to the formula:

$$Me_3SiO[MeRSiO]_8[HMeSiO]_{22}SiMe_3$$

$R=n-C_{12}H_{25}$, $n-C_{14}-H_{29}$ in a ratio of 2:1
Me=methyl

To test the properties of the pigments treated with conventional surface coating materials and with surface coating materials according to the invention, a homogeneous mixture consisting of the unground base pigment and the additive was prepared by mixing for at least one hour in a mixing unit and the resulting mixture subsequently ground as shown in Tables 1 and 2. The ground products were used in the tests described in the following (Table 3 et seq).

TABLE 1

Pigments surface-coated in accordance with the invention

| Example No. | Base pigment | Additive | Quantity added % by weight | Mill |
|---|---|---|---|---|
| A1 | A | 1 | 0.2 | Jet mill |
| A2 | A | 1 | 0.5 | Jet mill |
| A3 | A | 1 | 0.5 | Pendulum roller mill |
| A4 | A | 1 | 1.0 | Vibrating disk mill |
| A5 | A | 2 | 0.5 | Vibrating disk mill |
| A6 | A | 3 | 0.5 | Vibrating disk mill |
| A7 | A | 4 | 0.5 | Vibrating disk mill |
| B1 | B | 1 | 0.2 | Jet mill |
| B2 | B | 1 | 0.5 | Jet mill |
| C1 | C | 1 | 1.0 | Jet mill |
| D1 | D | 1 | 0.5 | Jet mill |
| E1 | E | 1 | 1.0 | Vibrating disk mill |
| F1 | F | 1 | 0.5 | Jet mill |
| F2 | F | 2 | 0.5 | Jet mill |
| G1 | G | 2 | 1.0 | Jet mill |
| H1 | H | 1 | 1.0 | Spray drying |

The following Table contains for comparison pigments which were coated with conventional, commercially available coating materials or which were ground without coating.

TABLE 2

Comparison Examples

| Example No. | Base pigment | Additive | Quantity added % by weight | Mill |
|---|---|---|---|---|
| A0 | A | ./. | ./. | Jet mill |
| B0 | B | ./. | ./. | Jet mill |
| C0 | C | ./. | ./. | Jet mill |
| D0 | D | ./. | ./. | Jet mill |
| E0 | E | ./. | ./. | Vibrating disk mill |
| E10 | E | X1 | 1.0 | Vibrating disk mill |
| F10 | F | X1 | 0.5 | Jet mill |
| G10 | G | X1 | 1.0 | Jet mill |
| H0 | H | ./. | ./. | Spray drying |
| H10 | H | X2 | 1.0 | Spray drying |

For the incorporation of pigments in paints, the paint processor expects favorable properties both in regard to coloring and in regard to dispersibility.

Coloring is basically tested in two ways. On the one hand, the pigment is incorporated in the lacquer in undiluted form (pure hue); on the other hand, the lightening power of the pigment is evaluated by blending with a white pigment (coloring in a white paste).

Dispersibility is tested in accordance with DIN 55 203. This DIN specification is based on the so-called Hegman test. In this test, the granularity of the pigment is determined in a grindometer. The desired fineness of the pigments is expressed in low grindometer values.

The processor expects the pigments to retain their favorable properties for a certain period (weeks to months). There should be no differences in the properties of the pigments, irrespective of whether they are processed immediately or after storage for a certain period.

The pigments produced in accordance with the invention show surprisingly high stability in storage and favorable processing properties during processing in paints, magnetic recording materials, toners, etc.

In the following Examples (Tables 3, 4 and 5), the coloring effect of the pigments treated in accordance with the invention is compared with that of conventional pigments after a period of storage. In addition, the Examples are intended to show that, even after storage, the pigments retain sufficient fineness, i.e. meet the requirements of the grindometer test.

TABLE 3

Coloring effect after storage (pure hue)
(Pure hue in Lack Alkydal F 48, a product of Bayer AG, pigment volume concentration PVC = 10%, determined in accordance with DIN 6174 equivalent to ISO/DIN 7724, 1-3 Drafts, CIELAB C 2/degrees)
Reference: Hue before storage

| Example | Storage time | ΔL | Δa | Δb | Evaluation of storage behavior* |
|---|---|---|---|---|---|
| A0 | 6 weeks | >0.3 | <0.5 | >0.5 | − Comparison test |
| A1 | 6 weeks | <0.3 | <0.5 | <0.5 | + |
| A2 | 6 weeks | <0.3 | <0.5 | <0.5 | + |
| B0 | 4 weeks | 0.3 | <0.5 | >0.5 | − Comparison test |
| B1 | 4 weeks | <0.3 | <0.5 | <0.5 | + |
| B2 | 4 weeks | <0.3 | <0.5 | <0.5 | + |

*Storage behavior is evaluated positively when none of the three color differences ΔL, Δa, Δb of the stored pigment to the color of the freshly ground pigments lies outside the following values:
ΔL < 0.3
Δa < 0.5
Δb < 0.5

TABLE 4

Coloring in white paste after storage
(White blend of 90% by weight titanium dioxide R-KB-2, a product of Bayer AG, 10% by weight colored pigment, pigment volume concentration PVC 10%, Lack Alkydal L 64, a product of Bayer AG, determined in accordance with DIN 6174 equivalent to ISO/DIN 7724, 1-43 Drafts, CIELAB C 2/degrees)
Reference: pigment before storage

| Example | Storage period | Rel. tinting strength | Δa | Δb | Evaluation[y] |
|---|---|---|---|---|---|
| A0 | 6 weeks | <10% | <1.0 | >1.0 | − Comparison test |
| A1 | 6 weeks | <10% | <1.0 | <1.0 | + |
| A2 | 6 weeks | <10% | <1.0 | <1.0 | + |

[y]Storage behavior is favorably evaluated when the relative tinting strength differs by less than 10% and Δa and Δb by less than 1 CIELAB unit after storage in relation to the freshly ground pigment.

TABLE 5

Dispersibility in paint after storage
Evaluation of granularity in accordance with DIN 55 203
Hegman test

| Example | Storage period | Grindometer values | Evaluation of storage behavior[x] |
|---|---|---|---|
| A0 | 6 weeks | >20 / <35 / >40 | − Comparison test |
| A1 | 6 weeks | <20 / <35 / <40 | + |
| A2 | 6 weeks | <20 / <35 / <40 | + |
| B0 | 4 weeks | <20 / — / >40 | − Comparison test |
| B1 | 4 weeks | <20 / — / <40 | + |
| B2 | 4 weeks | <20 / — / <40 | + |

[x]Evaluation of storage behavior: storage behavior is evaluated positively when the Grindometer values are <20/ <35 / <40 after storage for at least 4 weeks.

Serious color deterioration can occur, particularly in white blends, on account of flocculation of the pigment particles. Flocculation can be eliminated by a so-called rubout. The following procedure is adopted for this purpose:

For testing, the stored pigment is incorporated in a white lacquer based on Lack Alkydal F 650 and Bayertitan R-KB-2 titanium dioxide white pigment (both products of Bayer AG) in a pigment volume concentration (PVC=volume concentration of the total quantity of white and colored pigment in the binder paste) of 10% with a ratio by weight of white pigment to colored pigment of 90:5. Coating of the resulting lacquers are rubbed out just before drying so that pigments present are converted into the deflocculated state. Colorimetric comparison (ΔE*=overall color difference to DIN 6174 equivalent to ISO/DIN 7724, 1-3 Drafts, CIELAB C 2/degrees) of the rubbed-out lacquer with the non-rubbed-out paint provides an indication of the tendency of the stored pigments to flocculate in the binder system in question. The overall color difference values ΔE* between the rubbed-out paint and the non-rubbed-out paint should be as low as possible.

TABLE 6

Difference in hue in binder pastes through flocculation

| Example | Storage period | ΔE* | |
|---|---|---|---|
| A0 | 6 weeks | 25.3 | Comparison test |
| A1 | 6 weeks | 2.1 | |
| A2 | 6 weeks | 2.4 | |
| B0 | 4 weeks | 26.2 | Comparison test |
| B1 | 4 weeks | 1.7 | |
| B2 | 4 weeks | 2.6 | |

The pigments according to the invention surprisingly show better grinding behaviour (higher throughput) during grinding than conventional pigments:

TABLE 7

| Example | Grinding Throughput (mill) % | |
|---|---|---|
| C0 | 100 | Comparison test |
| C1 | 115 | |
| D0 | 100 | Comparison test |
| D1 | 110 | |

Pigments are normally supplied in bags or in large containers. The processor has to transfer the pigments to storage silos, conveyors and metering systems. This can involve considerable dust emission. Accordingly, reductions in dust emission are always desirable.

In the following Examples, dust emission is tested in a dust measuring apparatus in which 40 g pigment are allowed to fall all at once from a height of 1300 mm through a vertical glass tube 45 mm in diameter into a 2 liter glass cylinder 120 mm in diameter. The dust emitted is carried past a photocell by means of an air stream of 1 m³/h through a 30 mm diameter glass tube, in which the gas flow rate is approximately 40 cm/s. The reduction in transmission caused by the dust is measured and converted in known manner into extinction values. The extinction values are a direct measure of the level of dust emission.

Extinction values below 0.05 characterize very low dust emission, extinction values between 0.05 and 0.1 low dust emission, extinction values between 0.1 and 0.2 moderate dust emission, extinction values between 0.2 and 0.4 serious dust emission and extinction values above 0.4 very serious dust emission.

TABLE 8

| Example | Extinction | Dust behavior Dust Emission | |
|---|---|---|---|
| F10 | 0.242 | Serious | Comparison test |
| F1 | 0.041 | Very low | |
| G10 | 1.000 | Very serious | Comparison test |
| G1 | 0.186 | Moderate | |

In the coloring of plastics, the processor expects the pigments to contain no coarse-grained agglomerates which cause rough surfaces on incorporation in the plastic and poor color qualities. The surface should be smooth and coloring in the plastic matrix should be uniform. Accordingly, good dispersibility of the pigments in the plastic is a requirement for incorporation in plastics.

The compatibility of a pigment with plastics is tested by the blown film test described in the following. An important criterion in this regard is the number of visible pigment specks on the surface of the plastic.

A premix is prepared from 350 g pigment and 150 g HD-PE (high-density polyethylene) having a melt index of approximately 20 by thoroughly mixing the pigment and the plastic powder by shaking in a plastic bag and passing the resulting mixture through a 2 mm sieve, followed by mixing in a Collin kneader at 195° C./60 r.p.m. 500 g HD-PE having a melt index of approximately 0.5 are then mixed with 7.1 g of the premix, extruded once at 220° C. and blown to films. 0.4 m² of the film is examined for pigment specks.

Pigment compatibility is evaluated by the number of specks:
very good: less then 10 specks
good: up to 20 specks
moderate: up to 50 specks poor: more than 50 specks.

TABLE 9

| | Pigment dispersibility after storage Blown film test | | | |
|---|---|---|---|---|
| Example | Storage period | Number of specks | Evaluation | |
| B1 | 3 weeks | 1 | Very good | |
| C0 | 4 weeks | >100 | Poor | Comparison test |
| C1 | 4 weeks | approx. 30 | Moderate | |
| D1 | 3 weeks | 1 | Very good | |
| H0 | ./. | 100 | Poor | Comparison test |
| H1 | ./. | 2 | Very good | |

Accordingly, surface coating with the silicon compounds according to the invention improves the behavior of the pigments in plastics and films, the pigments showing favorable behavior even after storage for several weeks and after incorporation in films.

If a plastic is colored with pigments, the processor expects the other properties of the plastic not to be affected and certainly not adversely affected as a result of coloring.

The coloring of plastics with pigments disturbs the homogeneous structure of the polymer matrix, resulting in deterioration of the mechanical properties, for example the notched impact strength and elongation at break, of the colored polymer in relation to the non-colored polymer. The better the dispersibility of the pigment used in the polymer matrix, the lesser the deterioration in the mechanical properties of the filled polymer. Granulated pigments are particularly difficult to disperse because, in their case, the granulate particles have to be coarsely dispersed and the pigment agglomerates finely dispersed in a single step. Notched impact strength in acrylonitrile-butadiene-styrene terpolymer (ABS):

90 Parts of the ABS plastic Novodur P2H-AT (a product of Bayer AG) and 10 parts pigment are mixed and extruded once in a twin-screw extruder at a temperature of 190° C. The extruded strands are granulated, dried and injection molded at 220° C. to standard test bars. The notched impact strength of 10 standard test bars is determined in accordance with DIN 53 453. Unpigmented samples are used as controls.

TABLE 10

| | Notched impact strength | |
|---|---|---|
| Sample | Improvement in notched impact strength in ABS $a_x$ by comparison with Example H0 (kJ/m$^2$) | Evaluation |
| H0 | 0.0 | Very poor Comparison Example |
| H1 | +4.0 | Very good |
| H10 | +3.6 | Good Comparison Example |

Some inorganic pigments have the ability to take up moisture from the atmosphere. Any uptake of moisture, which does of course differ in level according to the storage period, is accompanied by a change in the performance properties of the pigments. However, the processor expects the properties of the pigments to remain constant for several months. Accordingly, the pigment manufacturer seeks to prevent or minimize moisture uptake in order as far as possible to eliminate any attendant effects on the processing properties.

It has surprisingly been found that the pigments coated in accordance with the invention take up very little moisture via the gas phase during storage in a moist atmosphere.

To investigate moisture uptake, the stored pigment was poured into a porcelain dish (layer height 0.5 cm) and stored for 7 days at room temperature in an exsiccator filled with water to a level of 5 cm.

TABLE 11

| | Moisture uptake during storage in a moist atmosphere | | |
|---|---|---|---|
| Example | Storage period | Increase in weight in % | Evaluation |
| A0 | 7 days | >2 | — Comparison test |
| A1 | 7 days | <0.6 | + |
| A2 | 7 days | <0.6 | + |
| A4 | 7 days | <0.6 | + |
| A5 | 7 days | <0.6 | + |
| A6 | 7 days | <0.6 | + |
| C0 | 7 days | >2.0 | — Comparison test |
| C1 | 7 days | <0.6 | + |
| E0 | 7 days | >1 | — Comparison test |
| E1 | 7 days | <1 | + |
| E10 | 7 days | >1 | — Comparison test |

During the incorporation of pigments in plastics, the organosilicon compound applied can diffuse down from the pigment surface under thermal stressing and migrate into the plastic matrix or to the plastic surface. This should not happen under any circumstances because organosilicon compounds passing to the surface can adversely affect the subsequent processing of the pigmented plastics (for example weldability, printability).

A polyethylene master batch 70% filled with a pigment according to the invention was subjected to ESCA (electron spectroscopy for chemical analysis), an extremely sensitive surface analysis technique, to determine whether, under thermal stressing during incorporation of the pigments according to the invention in the plastic, the organosilicon compound applied detaches itself from the pigment surface and migrates to the surface of the plastic.

Table 12: Migration behavior in colored plastic
Example Result of ESCA analysis
F1 No silicon at the surface of the test specimen The result of the sensitive ESCA surface analysis shows that the pigments according to the invention do not release any substances which migrate to the surface of the plastic and, in doing so, influence the performance properties of the colored plastic.

A coating material applied to the pigment surface should adhere firmly on a general level and not only during incorporation in plastics. The processor expects the pigment to retain its properties, even after prolonged storage, and not to undergo a general deterioration in its properties as a result of gradual detachment of the coating materials, for example at high storage temperatures.

As a further test of the strength of adhesion of the silicone oils to the pigment surface, the weight loss which the pigments undergo during heating for 1 hour in a drying oven to 200° C. is determined.

It was found that, even under very severe thermal stressing, the pigments according to the invention show a distinctly lower weight loss than pigments treated with conventional surface coating materials. This is a reflection of the considerably improved adhesive strength of the silicone oils in the pigments according to the invention.

TABLE 13

| | Heat test (weight loss) | |
|---|---|---|
| Example | Additive | Quantity added % | Weight loss % |
| F10 | X2 | 0.5 | 0.10 Comparison test |
| F2 | 2 | 0.5 | 0.05 |

It will be appreciated that the instant specification and claims are set forth by way of illustration and not limitation, and that various modifications and changes may be made without departing from the spirit and scope of the present invention.

What is claimed is:

1. A coated inorganic pigment comprising at least 0.1% by weight and at most 5% by weight of one or more polyorganosiloxanes, wherein the polyorganosiloxanes have viscosities of 10 to 100,000 mPa.s and a relative molecular weight of 500 to 500,000, have no reactive or crosslinking groups, contain at least one $C_9$–$C_{25}$ Si-alkyl and/or one $C_9$–$C_{25}$ Si-aryl group per molecule, the total content of these groups in the polyorganosiloxane being 7 to 70 by weight and the other organic radicals contained in the polyorganosiloxane having 1 to 8 carbon atoms.

2. A coated inorganic pigment as claimed in claim 1, wherein the polyorganosiloxanes contain at least one $C_{11}$–$C_{20}$ Si-alkyl and/or $C_{11}$–$C_{20}$ Si-aryl group per molecule.

3. A coated inorganic pigment as claimed in claim 1, wherein the total content of the Si-alkyl and/or Si-aryl groups in the polyorganosiloxane is 20–50% by weight.

4. A coated inorganic pigment as claimed in claim 1, wherein the other organic radicals in the polyorganosiloxane are methyl radicals.

5. A coated inorganic pigment as claimed in claim 1, wherein the polyorganosiloxanes contain per molecule at least one Si-alkyl group with a linear $C_{11}$–$C_{20}$-alkyl radical.

6. A coated inorganic pigment as claimed in claim 1, wherein the pigments are white pigments.

7. A coated inorganic pigment as claimed in claim 1, wherein the pigments are colored pigments.

* * * * *